(12) United States Patent
Pritchett

(10) Patent No.: US 7,368,150 B2
(45) Date of Patent: May 6, 2008

(54) METHOD OF APPLYING A HEAT REFLECTIVE COATING TO A SUBSTRATE SHEET

(76) Inventor: Joseph E Pritchett, 6545 W. 106th St., Overland, KS (US) 66212

( * ) Notice: Subject to any disclaimer, the term of this patent is extended or adjusted under 35 U.S.C. 154(b) by 266 days.

(21) Appl. No.: 10/845,547

(22) Filed: May 14, 2004

(65) Prior Publication Data

US 2005/0255284 A1    Nov. 17, 2005

(51) Int. Cl.
*B05D 5/00* (2006.01)
*B05D 3/00* (2006.01)

(52) U.S. Cl. .................. 427/412; 427/209; 427/243; 427/372.2; 427/412.1

(58) Field of Classification Search ............ 427/209, 427/212, 243, 372.2, 412, 412.1; 428/74
See application file for complete search history.

(56) References Cited

U.S. PATENT DOCUMENTS

| | | | |
|---|---|---|---|
| 5,085,897 A | | 2/1992 | Luckanuck |
| 5,617,687 A | * | 4/1997 | Bussey et al. ............ 52/404.2 |
| 5,695,812 A | | 12/1997 | Pritchett |
| 5,885,654 A | | 3/1999 | Hagiwara et al. |
| 5,985,433 A | | 11/1999 | Leiser et al. |
| 6,092,622 A | * | 7/2000 | Hiers et al. ................. 181/290 |
| 6,251,971 B1 | | 6/2001 | Chen et al. |
| 6,274,239 B1 | | 8/2001 | Peruzzotti et al. |
| 6,284,313 B1 | | 9/2001 | Matthews et al. |
| 6,338,366 B1 | | 1/2002 | Williams |
| 6,388,044 B1 | | 5/2002 | Yoshida et al. |
| 6,399,186 B2 | * | 6/2002 | Matthews et al. ....... 428/306.6 |
| 2003/0060107 A1 | * | 3/2003 | Gooliak ..................... 442/131 |

FOREIGN PATENT DOCUMENTS

| | | |
|---|---|---|
| JP | 7-220536 | 8/1995 |
| WO | WO 94/25664 | 11/1994 |

OTHER PUBLICATIONS

"International Energy Report" Advertising Brochure From Superior Products, Dated Apr. 1, 2001, Information on Application of Supertherm® Coating.
"Super Therm R20 Insulation Coating" Advertising Brochure From Superior Products (undated), Information on Supertherm® Properties.

* cited by examiner

*Primary Examiner*—William Phillip Fletcher, III
(74) *Attorney, Agent, or Firm*—Richard C. Litman

(57) ABSTRACT

The method includes applying a heat reflective coating to a substrate sheet of construction material and air drying the heat reflective coating on the construction material. The method is directed particularly to the coating of insulation material, such as fiberglass batts, at the time of manufacture, but may be applied to virtually any sheet of material in order to improve the insulation properties and structural value of the material. By completely encapsulating fibrous insulation material with the impervious heat reflective coating, the emission of irritant fiber particles and corresponding health hazards are eliminated. Also, the efficiency of the insulation material is improved by sealing out moisture when completely encapsulated by the coating.

6 Claims, 6 Drawing Sheets

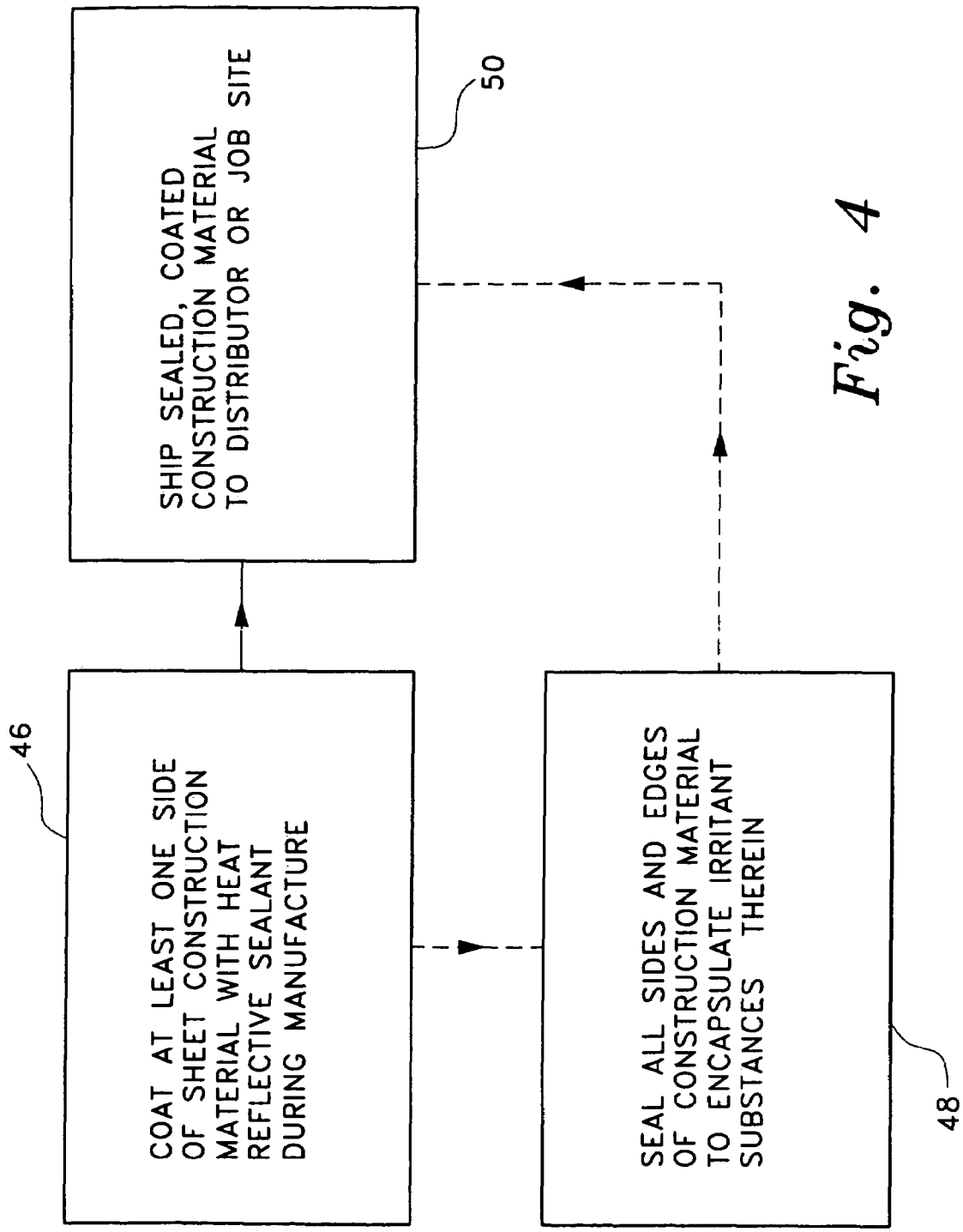

METHOD OF APPLYING A HEAT REFLECTIVE COATING TO A SUBSTRATE SHEET

BACKGROUND OF THE INVENTION

1. Field of the Invention

The present invention relates generally to the covering of solid, dry materials with a coating applied as a liquid. More specifically, the present invention relates to the coating of sheet construction materials (e.g., fiberglass insulation batts, gypsum wallboard, plywood and chipboard sheets, etc.) with a relatively thin coating of a heat reflective material known by the trade name Super Therm® to improve the heat resistance and insulating capabilities of such materials in building construction.

2. Description of the Related Art

Ever increasing energy costs have resulted in greater emphasis in energy efficient buildings and other structures over the years. Homes and other structures constructed much before the midpoint of the twentieth century were seldom provided with any significant insulation. At that time, the cost of the insulation material in comparison to energy costs, generally resulted in payback periods measured in decades. However, the rapid rise of energy costs of various types, i.e. electricity, natural gas, etc., have resulted in much greater interest in providing energy efficient structures than in past decades.

In many areas, homes and other structures are required to be constructed to meet certain minimum standards of energy efficiency. This generally results in at least three inch thick fiberglass insulation in exterior walls and at least six inches of ceiling insulation, if not more. Greater insulation capability is generally limited by the wall and ceiling thickness of the structure, as it is impossible to provide greater insulation effectiveness without substantially increasing the thickness of the insulation, when using loose fill and non-woven fibrous materials for insulation.

This is because such materials do not reflect heat, but rather serve to trap air in the insulating blanket. It is the trapped air, and not the material of which the insulation blanket itself is formed, which provides the insulation properties of the material. Such an insulating layer of air requires relatively great thickness, i.e. on the order of at least a few inches, in order to be effective. The primary task of the insulation material is to prevent circulation of the air within the material, and thus convection of heat from one side of the insulating space to the other.

The present inventor has developed a product which is sold under the trade name Super Therm®, which serves as a temperature barrier by means of a different principle. Super Therm® essentially comprises a waterborne, acrylic urethane resin based, ceramic filled material which may be applied as a relatively thin coating to reflect heat, rather than primarily serving as a dead air space as in conventional insulation. Super Therm® includes ceramic particles of specifically graduated sizes, with the different particle sizes migrating to different depths in the liquid coating before curing and serving to reflect electromagnetic energy of different wavelengths in the short wave, long wave, and infrared bands. Super Therm® is also highly thermally non-conductive when cured.

As such, Super Therm® is conventionally applied to relatively thin surfaces, e.g. sheet metal, asphalt, and fiberglass roof panels and the like, etc., where it is impractical or impossible to apply thick layers of fiberglass or other insulation material. Super Therm® is particularly well suited for application to the exterior surfaces of various structures, e.g. building and vehicle roofs, etc., although it can also be applied to interior surfaces as well, where it serves to reflect heat back through the panel to which it is applied.

As Super Therm® is typically applied to the exterior surfaces of relatively thin, planar structures such as roof sheathing, oftentimes no additional insulation batts or blankets are installed in such structures. Indeed, it has been found that the equivalent R value (thermal resistance) of a single coat of Super Therm® is R-19 equivalence, or about that of a fiberglass batt having a thickness of six inches. Accordingly, the application of one or two coats of Super Therm® having a thickness of only on the order of eight to sixteen mils is often accomplished in order to preclude the need to install thicker insulation material within the walls and ceilings of a structure.

The application of Super Therm® to the exterior or interior surfaces of a structure which is also conventionally insulated with relatively thick fiberglass batts, polystyrene foam material, or other thick, air entrapping material, results in even better insulation of the structure than if only one of the materials (either Super Therm® or air entrapping material) is used alone. As a result, Super Therm® has been applied to the exterior walls and roofs of many structures which are already insulated with conventional fiberglass batts or similar air entrapping insulation materials.

Yet, to the knowledge of the present inventor, Super Therm® has never been applied directly to such air entrapping insulation materials (e.g., fiberglass batts, etc.) or to panels of other building materials, except in testing by the present inventor. Such application would serve to increase the effective insulating values of the building materials, without need to apply a separate coating of Super Therm® to the exterior or interior surfaces of the structure, or to install additional thicknesses of air entrapping insulation material. There are good reasons why such application of Super Therm® to existing insulation and other building panels in the field, are not practicable. As with any liquid application, particularly when sprayed, there is a problem with overspray when applying the liquid to relatively small panels. Moreover, the additional labor required to coat such panels with Super Therm® or any other liquid product is not economically efficient in the field, when considering the typical hourly labor rates for the skilled labor involved in building construction.

As a result, the present inventor has developed processes and methods for coating such construction materials and panels with Super Therm® at the time of manufacture. This provides a number of heretofore unrecognized benefits: (1) The coating of the kraft paper backing side of fiberglass (or similar) insulation, results in the kraft paper providing the equivalent of thermal insulation (actually, primarily thermal reflection) in addition to the air entrapment of the insulation batt itself. Thus, such material when treated with Super Therm® essentially becomes two insulation components in a single sheet or batt of material. This is also true when Super Therm® is applied to the paper backing of a sheet of gypsum wallboard or to polystyrene or other plastic foam insulation board. A coating of Super Therm® to other building panels, e.g. plywood and chipboard panels, etc., results in those panels having insulation as well as structural properties. (2) The complete coating or encapsulation of a fiberglass batt with Super Therm® seals the fiberglass strands and prevents the escape of minute fiberglass particles from the batt. This eliminates the irritation commonly experienced by workers handling such materials as the minute glass particles imbed themselves in the skin and are inhaled.

While such particles may hot be carcinogenic, they are definitely irritants, and the application of Super Therm® to such material at the point of manufacture eliminates this problem to workers in the field. (3) The application of Super Therm® at the manufacturing site results in such treated insulation panels having greater insulation efficiency. Thus, such treated panels may be only about half as thick as untreated panels, to provide the same insulating effect. This allows e.g. three inch thick batts to be used, where six inch thick batts would otherwise be required. In other words, twice as many Super Therm® coated batts providing a given insulation rating, may be contained and shipped in a given volume as compared to conventional, uncoated batts. (4) The elimination of overspray and similar problems in the field has been noted above. (5) The elimination of the labor costs of coating various materials with Super Therm® in the field, has also been noted further above. This also relates to the advantage of the economy of scale which may be achieved when coating various building materials with Super Therm® at the manufacturing site. (6) The addition of a coating of Super Therm® to a substrate sheet also improves the flame resistance, sound dampening, and mold and mildew resistance of the resulting composite material. Super Therm® has been tested and found to have zero flame spread, according to ASTM E-84-89 UL 723 test. Silver citrate is a Super Therm® additive which prevents organic growth (mold, mildew, etc.). Further tests have shown that a ten mil thick (dry) coating of Super Therm® can result in a reduction in sound transmittal through the Super Therm® and substrate composite, of 68%.

The present inventor is unaware of any process or method for coating or encapsulating sheet materials, and especially insulating materials, with Super Therm® or other thermally reflective liquid coating material, particularly at the point of manufacture before being shipped to the field for installation. A discussion of the related art of which the present inventor is aware, and its differences and distinctions from the present inventive method, is described below.

U.S. Pat. No. 5,085,897 issued on Feb. 4, 1992 to John S. Luckanuck, titled "Fire Retardant Insulation Spray Coating Method," describes the formulation of a coating for structural steel members to insulate them in the event of a building fire, in order to prevent their collapse. The coating material is applied to a thickness of at least two inches and intumesces upon the application of extreme heat to provide a thick, air encapsulating blanket about the structure to which it has been applied. Such a thick coating is impracticable on relatively thin sheet construction materials such as plywood, gypsum wallboard, etc. While such a thick coating might be acceptable on thinner batts of fiberglass or similar insulation material, the thickness of the Luckanuck coating would preclude any flexibility for the batt, preventing it from being rolled for storage and transport or flexed into position during installation. Moreover, the Luckanuck coating cannot be applied at the manufacturing site for such steel support structures, as it would have to be removed from any connecting joints during the assembly of the structure, and then reapplied to any exposed areas of the structure after assembly. The very thin coating of the present material does not produce such problems, and may be efficiently applied at the building material manufacturing site.

U.S. Pat. No. 5,695,812 issued on Dec. 9, 1997 to Joseph E. Pritchett, titled "Method For Abating Bio-Hazardous Materials Found In Coatings," describes the application of a coating material having the trade name of Rust Grip® to surfaces having asbestos and/or lead paints thereon. According to the '812 U.S. patent, Rust Grip® is a diphenyl methane diisocyanate based polyurethane containing proprietary additives and other metallics. The Rust Grip® percolates into any porosity in the underlying material, and bonds with the material to encapsulate and seal the material. The method of the '812 U.S. patent to the present inventor, teaches away from the method of the present invention in at least two respects: (1) The Rust Grip® coating does not provide any appreciable thermal barrier for the underlying material to which it is applied, as it has no ceramic or other particles which provide any thermally reflective or thermally non-conductive properties, and (2) there is no motivation to apply the Rust Grip material to new, clean panels of construction material at the time of their manufacture, when they are free of contaminants. The only appropriate venue for the application of the method of the '812 U.S. patent is in the field, where deteriorating asbestos insulation and flaking lead paint would be found. In contrast, the present method is directed to application at the point of manufacture of the underlying substrate material, to achieve the accompanying efficiencies of scale and control of application of the coating in such an environment.

U.S. Pat. No. 5,885,654 issued on Mar. 23, 1999 to Yoshio Hagiwara et al., titled "Polysilazane-Based Coating Solution For Interlayer Insulation," describes the composition of an electrically insulating material (not thermally insulating or thermally reflective, as in the coating applied in the method of the present invention). The Hagiwara et al. coating uses a dialkyl ether as a solvent, rather than being water soluble as in the Super Therm® material used in the coating method of the present invention. Moreover, the Hagiwara et al. coating requires baking at extremely high heat to provide the desired electrical insulating property, and is particularly directed to application between electrically conductive films or the like, rather than being applied to the outer surface of a structural or insulating building panel, as in the present invention.

U.S. Pat. No. 5,985,433 issued on Nov. 16, 1999 to Daniel B. Leiser et al., titled "High Temperature Resistant Organopolysiloxane Coating For Protecting And Repairing Rigid Thermal Insulation," describes a liquid material formulated for the repair of damage to thermally protective tiles and the like as applied to leading surfaces of reentry vehicles such as the STS ("Space Shuttle"). The Leiser et al. repair substance is not so much a heat reflective material, as it is a heat resistant material capable of withstanding extremely high temperatures and aerodynamic friction. As the Leiser et al. material is particularly adapted for the repair of damaged protective tiles, it clearly is intended for application in the field rather than at the manufacturing site, as in the present inventive method.

U.S. Pat. No. 6,251,971 issued on Jun. 26, 2001 to Chaofeng Chen et al., titled "Thermal Insulation Coating For Pipes," describes an insulation material comprising microballoons in a water based epoxy material. Conventional hydraulic cement is mixed with the liquid immediately before application, to absorb the water for curing. The resulting product is quite brittle, as would be expected in a material containing a significant amount of concrete. This precludes the installation of such a coating to structural panels at their point of manufacture, as the coating would chip or flake off due to flexure of the panels during shipping and handling. The Super Therm® material used in the coating method of the present invention is relatively flexible and will not chip or flake off when the panel is flexed or folded.

U.S. Pat. No. 6,274,239 issued on Aug. 14, 2001 to Franco Peruzzotti et al., titled "Insulation Coating For Electric Cable Containing Polyolefin And Polymer With Ester And Epoxy Groups," describes a composition having greater water resistance than other insulating coatings for electrical wiring. While the Peruzzotti et al. coating may be effective in providing a durable and water resistant, electrically insulating coating for wiring, Peruzzotti et al. make no disclosure of any thermally reflective and/or thermally non-conductive properties for their coating material. The Peruzzotti et al. coating would not be suitable for application to large, flat structural or insulation panels due to the relatively thick coating required for such resilient plastic materials, in any event.

U.S. Pat. No. 6,284,313 issued on Sep. 4, 2001 to Kent R. Matthews et al., titled "Coated Air Duct Insulation Sheets And The Like And The Method Of Coating Such Sheets," describes a process involving multiple coats of a water soluble, latex base material to the otherwise uncoated surface of a fiberglass batt. The coats are apparently applied directly to the glass fibers on one side of the batt, rather than to any kraft paper backing on the batt. The Matthews et al. composition requires at least two heat treatments, with one treatment partially curing the first coat and the second heat treatment fully curing the two coats. No complete encapsulation of the glass fibers is disclosed by Matthews et al., and no thermally reflective or thermally non-conductive properties are described by Matthews et al. for their composition.

U.S. Pat. No. 6,338,366 issued on Jan. 15, 2002 to David R. Williams, titled "Pipe Insulation With A Jacket Measured In Fractions Of An Inch," describes the forming of a thin sleeve having an open axial seam which may be spread to install the sleeve over a pipe. The sleeve is coated on either its inner or its outer surface, or both, with a heat reflective coating of from 30 to 250 mils. The coating is described as containing ceramic particles, but no specific range of particulate size and/or electromagnetically reflective wavelength is disclosed by Williams. In any event, Williams clearly installs his sleeves over existing runs of previously installed pipes. Otherwise, there would be no need to provide split sleeves for installation over the pipes. The present invention differs in that it teaches the application of a thermally reflective coating material directly upon at least one surface of a planar construction panel or blanket at the site of manufacture of the panel, rather than upon a sheet of material which is then applied over an existing installation, as in Williams.

U.S. Pat. No. 6,388,044 issued on May 14, 2002 to Yuji Yoshida et al., titled "Polyether Resin And Coating Solution For Forming Insulation Film," describes a resin formulation for application to electronic components. The resin and coating of Yoshida et al. is electrically insulating, i.e. electrically non-conductive, but Yoshida et al. are silent regarding its thermal properties, other than to state that the composition is thermosetting.

U.S. Pat. No. 6,399,186 issued on Jun. 4, 2002 to Kent R. Matthews et al., titled "Coated Air Duct Insulation Sheets And The Like And The Method Of Coating Such Sheets," is a division of the '313 U.S. patent to the same inventors, discussed further above. The same points of difference noted further above between the method and apparatus of the '313 U.S. patent and the present invention are seen to apply here as well.

International Patent Publication No. WO 94/25,644 published on Nov. 10, 1994 to Schuller International Inc., titled "Method And Apparatus For Preparing A Fibrous Batt," describes an apparatus and method quite similar to that described in the '186 and '313 U.S. patents to Matthews et al., discussed further above. The Schuller International Inc. system also uses a thermosetting resin to coat fibrous batt material, unlike the air curing of the material used with the present inventive method. Moreover, Schuller International Inc. does not describe any form of thermal reflectivity or thermal non-conductivity for their resin, unlike the thermally reflective resin used with the present method.

Japanese Patent Publication No. 7-220,536 published on Aug. 18, 1995 to Hitachi Cable Ltd., titled "Electric Power Cable," describes (according to the English abstract) an electrically insulating epoxy polymer for coating electrical cables therewith. No thermally reflective or thermally non-conducting properties are apparent in the English disclosure, nor is any disclosure apparent of the application of any coating to a planar construction panel, as provided by the present invention.

Finally, advertising materials provided by Superior Products, Inc., titled "International Energy Report" dated Apr. 1, 2001 and "Super Therm R20 Insulation Coating" (undated), illustrate and describe the properties and application of Super Therm® coating material to various substrates forming building structures in the field. Various substrates are described and/or shown, including concrete, tar, asphalt, and/or rubber coated roofs, shingles, various sheet metal surfaces, wood, and polyurethane foam. While fiberglass is mentioned, the material noted is not glass fiber material forming insulation batts, but thin cast or otherwise formed and cured, rigid fiberglass sheet material having no substantial thermal insulating properties. In fact, the only mention of such structural material in the Super Therm advertising materials is in combination with another Superior Products coating material known as Super Base(HS)®, and used as a base coat or primer. No disclosure is made of the application of Super Therm® directly to fiberglass insulation batts, either in the field or at the point of manufacture, nor is any disclosure made of the coating of any sheet building or structural materials with Super Therm® at the point of manufacture. Up to the development of the present inventive method, the entire objective of the use of Super Therm® has been for use in coating previously constructed structures, generally on their exterior surfaces, rather than coating or treating newly manufactured structural or insulating panels at the point of manufacture, as disclosed herein.

None of the above inventions and patents, taken either singly or in combination, is seen to describe the instant invention as claimed. Thus a method of applying a heat resistant coating to a substrate sheet solving the aforementioned problems is desired.

SUMMARY OF THE INVENTION

The present invention generally comprises a method of applying a heat reflective coating to a substrate sheet of construction material. More particularly, the present method comprises the coating of relatively large (i.e., four by eight feet, more or less) flat panels of construction material with a heat reflective coating, at the point of manufacture of the panels or at some other central point before the panels are distributed to construction sites in the field. The present method may be adapted to various types of construction panels including plywood, chipboard, gypsum wallboard, etc., but is particularly well suited for coating relatively thick insulation materials (fiberglass batts, foam plastic boards, etc.) with a heat reflective coating. The heat reflective coating material preferred for use in the present method, results in such coated insulation materials having two different principles for retaining or rejecting heat. Conventional insulation materials such as fiberglass batts and foam plastics rely upon the air entrapped within the material to slow the rate of heat transfer from one side of the batt or panel to the other. The glass or plastic material per se of such panels is not a particularly good thermal insulator, but rather entraps and holds air within the panel to prevent significant circulation of the air, with the air serving as the insulating substance within the panel.

In contrast, the coating material used with the present method serves primarily to reflect electromagnetic energy in certain bands or wavelengths in and around the infrared portion of the spectrum. This is accomplished by means of very fine, minute ceramic particles carried within the coating, with the particles comprising four different compounds ranging from five to 150 microns in size to effectively block and reflect the critical electromagnetic energy which transmits most of the heat energy from a radiant source (e.g., the sun). The combination of two different insulating principles in a single panel of material, results in a synergistic effect which increases the insulating efficiency particularly of the insulating panel which is coated according to the present method.

The Super Therm® coating material used with the present method provides further advantages. One of those advantages is fire and flame resistance. A sheet of material coated with an approximately ten mil thick coat of Super Therm® resulted in a flame spread of zero, according to ASTM test E-84-89 UL 723. Moreover, Super Therm® also resists the growth of mildew, mold, and other organisms by means of the addition of silver citrate thereto, to act as a fungicide. Super Therm® also acts as a sound deadening material. Tests have shown that a composite structure comprising a panel coated with Super Therm®, resulted in a reduction in sound transmission of 68% through the panel.

These and other features of the present invention will become readily apparent upon review of the following specification and drawings.

BRIEF DESCRIPTION OF THE DRAWINGS

FIG. 4 is a flow chart describing the basic steps in the present method.

Similar reference characters denote corresponding features consistently throughout the attached drawings.

DETAILED DESCRIPTION OF THE PREFERRED EMBODIMENTS

The present invention comprises various embodiments of a method of applying a heat reflective coating to a building construction panel, thereby increasing the insulation efficiency of the panel. The present invention also encompasses composite panels formed by applying the heat reflective coating to various types of building construction panels, as well. While the present invention is directed particularly to the coating of fibrous insulation batts with a heat reflective coating material, it may also be directed to the coating of other types of building construction panels as well.

Figure 1A:
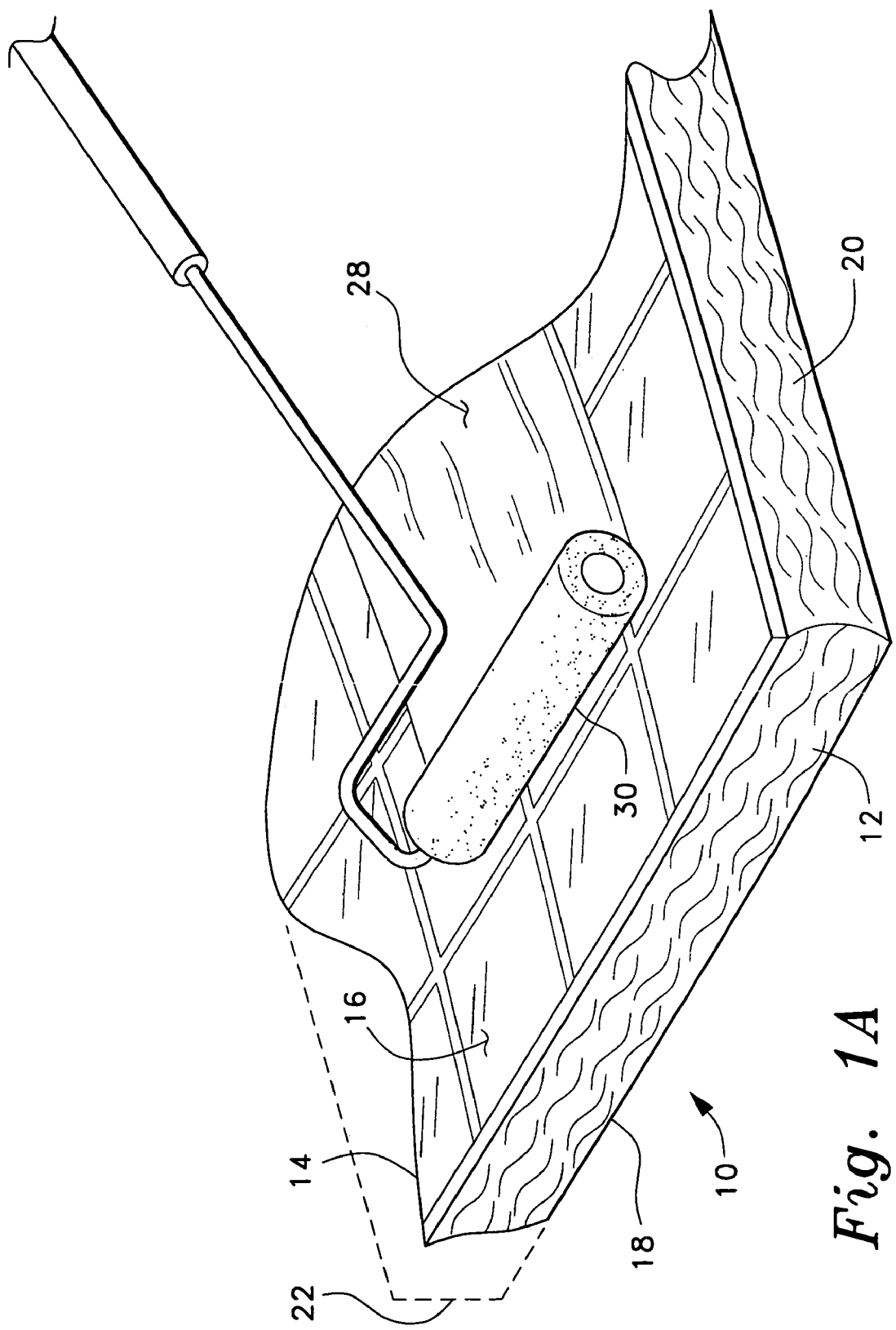
FIGS. 1A, 1B and 1C are perspective views of sheets of fiberglass batt insulation, showing the application of a heat reflective coating thereto respectively by means of a roller, a brush, and by spraying, in accordance with the present invention.
Figure 1B:
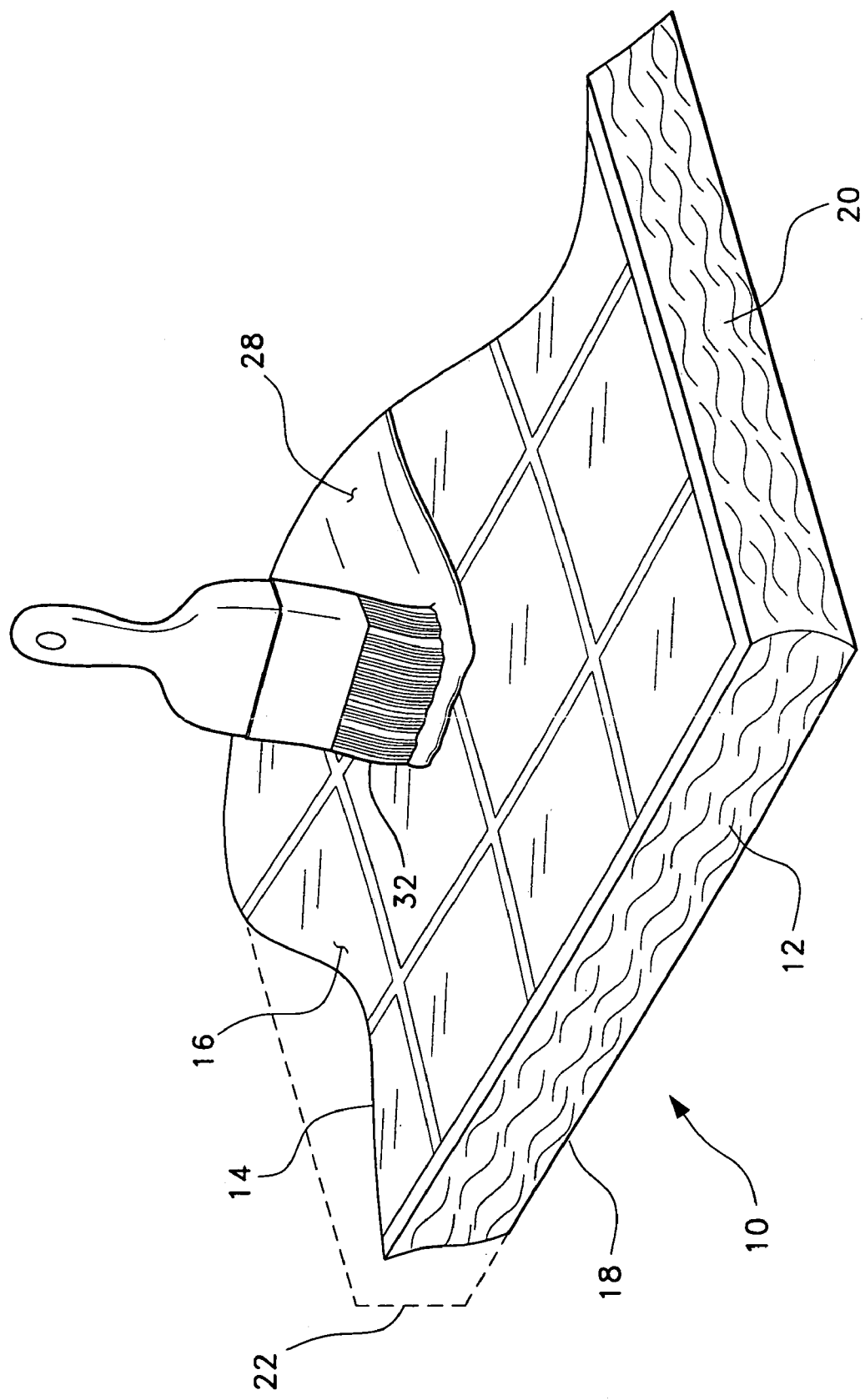
Figure 1C:
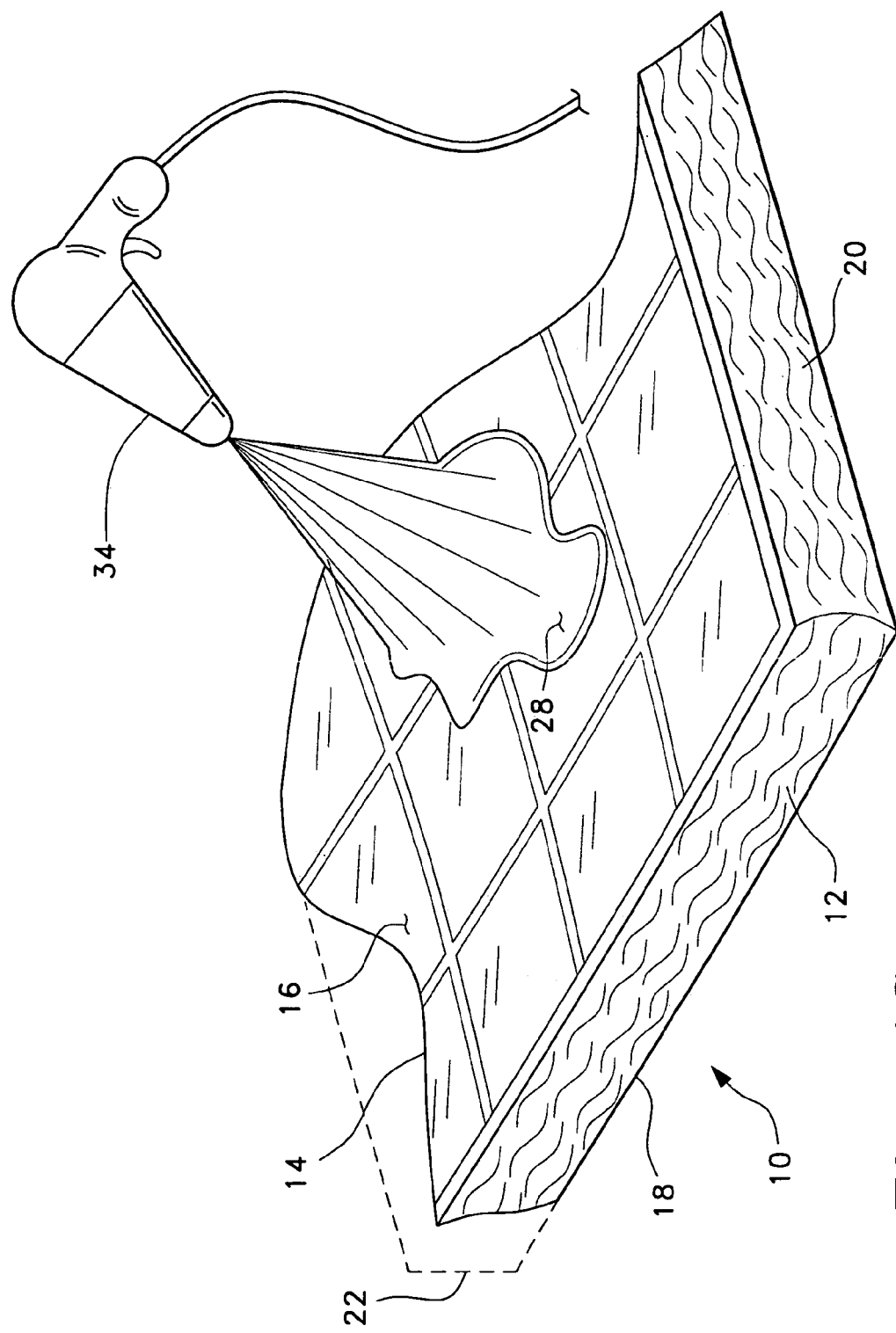
Figure 2:
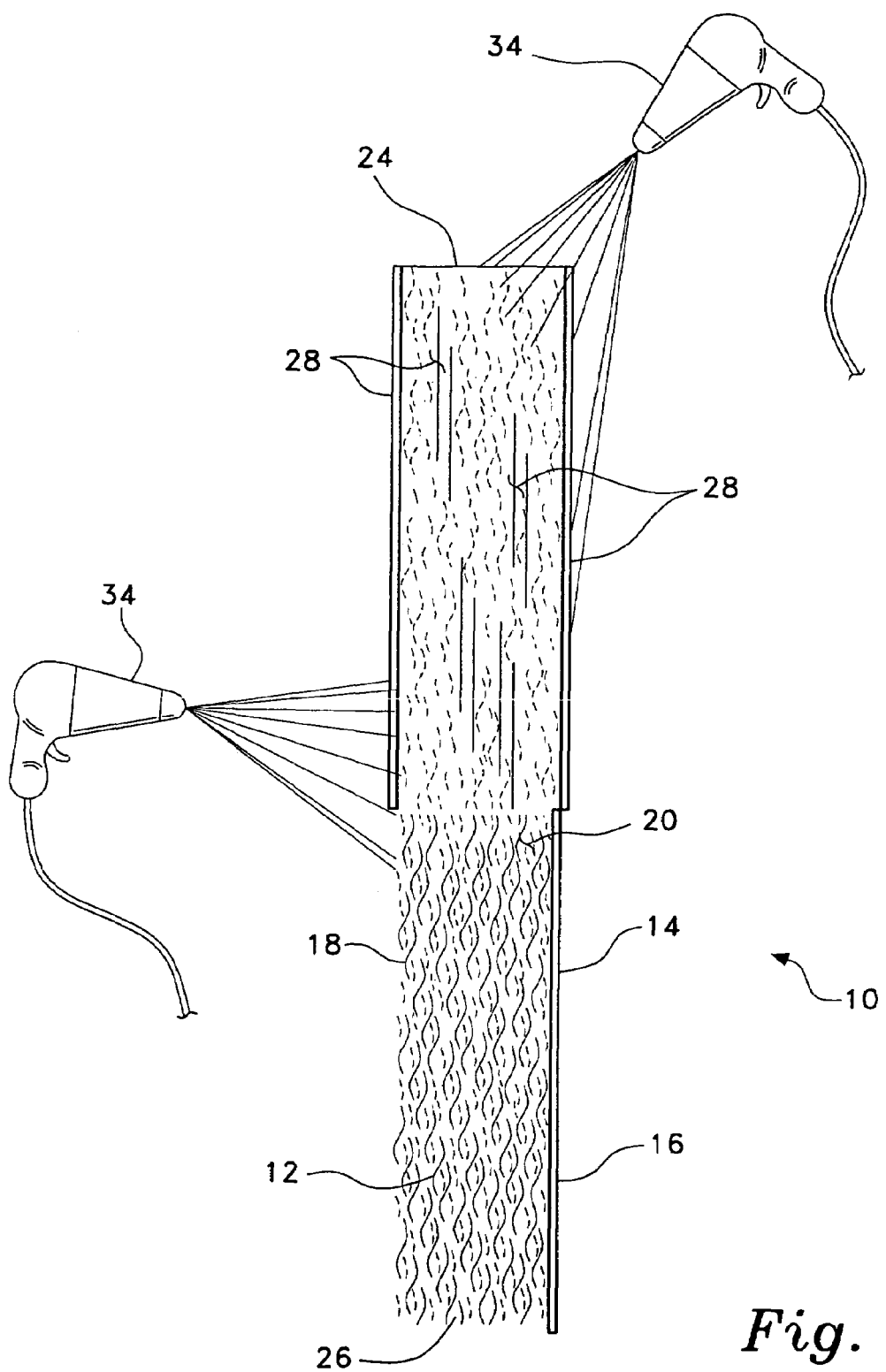
FIG. 2 is an edge elevation view of a sheet of fiberglass batt insulation, showing the application of the heat reflective coating material thereto to completely encapsulate the batt.

FIGS. 1A through 1C provide perspective views illustrating the process of coating various types of building construction panels with a heat reflective coating in accordance with the present invention. In FIGS. 1A through 2, a generally flat, planar panel or batt 10 of insulation material formed of loose fibrous material 12 (e.g., fiberglass, mineral wool, etc.) is illustrated. The batt 10 has one side or surface 14 having a backing sheet of kraft paper 16 or the like bonded thereto, as is conventional with such insulation batts 10, with an opposite open or uncovered surface 18. The size and shape of the insulation batt 10 is normally rectangular as manufactured, and is defined by opposed first and second edges 20 and 22 and opposed first and second ends 24 and 26 (shown in FIG. 2).

In FIGS. 1A through 1C, the various insulation batts 10 are shown being coated with a heat reflective coating material 28 which is applied in a liquid form and which air dries or cures to provide a flexible heat reflective coating or layer on at least one side, e.g. the kraft paper backing sheet 16, of the insulation batt 10. Various means may be used to apply the coating 28, e.g. the roller 30 of FIG. 1A, brush 32 of FIG. 1B, and/or by spray gun 34 or other spraying means, generally as shown in FIG. 1C.

One of the major points of the present invention is that the coating process be carried out at the time and location of manufacture of the substrate, e.g. the insulation batt 10, or at least at some centralized location prior to shipment of the substrate panel to the field for installation in or on a building structure. As various steps are involved in the manufacture of any building construction paneling, the present invention anticipates the addition of a further step in the manufacturing process for coating the panels with the heat reflective coating material 28. It is anticipated that the most efficient means of providing the coating 28 on at least one surface of the substrate is by spraying the coating 28 in place, either by manually manipulated spray guns or by a robotic system, as is commonly used in automotive painting during manufacture. However, other application means may be used as desired.

The application of the coating material 28 at the time of manufacture provides significant improvements in efficiency over other alternatives for coating the substrates in the field at the point of installation of the panels on or in a building structure. The use of automated equipment, or at least workers specializing in the application of the coating material to the substrate, results in significant savings in labor when compared to the alternative of applying the coating in the field at the construction site. Building construction workers are generally relatively skilled, and their wages generally reflect their primary skills. The use of such workers to apply a coating to building panels at the construction site, would not be cost effective. Moreover, such application at the construction site would require that painting equipment be provided at the site before the final interior and exterior finish work was scheduled, in order to coat the substrate panels prior to their installation in the structure. This additional step of providing such specialized equipment at some point prior to its normal use during the finishing of the structure, would result in additional costs to the contractor. Also, the need to perform such a coating operation on the job site, in relatively small batches, results in a relatively high percentage of wasted product when spray guns, rollers, etc. must be cleaned after applying the coating to a relatively few panels, as compared to a manufacturing process where the coating is applied in a continuous operation. Overspray is another potential problem in the field, with such overspray not being a concern in an enclosed manufacturing plant which is configured to handle such concerns.

FIG. 2 illustrates an alternative coating process, in which the entire substrate panel is coated with the heat reflective coating material 28 on all sides, edges, and ends to completely encapsulate the panel. In FIG. 2, a panel of insulation batt 10 is shown being coated with a heat reflective material 28 by means of the spray guns or spray apparatus 34. As shown in FIG. 2, the spraying process has coated or is in the process of coating the upper portions of each of the sides 14 and 18, the first or upper end 24, and the two edges 20 and 22 (not visible in FIG. 2, but equivalent to the edges 22 shown in broken lines in FIGS. 1A through 1C). The process is continued until all sides, edges, and ends of the batt 10 are completely coated with the heat reflective coating 28, thereby completely encapsulating and sealing the fibrous insulation material 12 forming the insulation batt 10.

This provides at least a few advantages for such a composite insulation panel 10. First, The coating of the batt 10 with the heat reflective coating 28 results in a composite insulation panel which is capable of providing far greater equivalent insulation than an untreated panel. It has been found that an untreated insulation batt having an insulation rating of R-19, will have an equivalent rating of approximately R-38 when coated with a thickness of twenty mils (0.02 inch, or two normal coats) of the heat reflective coating material 28 (i.e., Super Therm®) used in the method of the present invention. (The R value of the insulation rating for such a composite batt is approximately equivalent, as the Super Therm® material operates on the principle of reflection of electromagnetic energy, rather than on the principle of low absorption of heat energy, as in the case of insulation products relying upon the entrapment of air therein, as in mineral fiber insulation batts.)

Secondly, the fibrous material 12 is completely sealed within the batt 10, thereby assuring that small fiber particles cannot escape from the batt 10 to form irritants to workers handling such an encapsulated batt 10. While such insulation fibers are not presently recognized as carcinogens, they most definitely are irritants, and result in considerable skin, eye, and respiratory irritation to the typical worker handling such material unless the worker is protected. By completely encapsulating such insulation batts 10 with a heat reflective coating 28, this problem is eliminated.

Third, by completely sealing the interior of the batt 10 against the entry of moisture therein, the insulating efficiency of the batt 10 is improved considerably. It has been found that the introduction of only a small amount of moisture into the fibers of a fiberglass insulation batt, will reduce the insulation properties of the batt by a significant amount. Testing has found that as little as 1.5% moisture in such a batt, can result in a loss of insulating efficiency of up to 35%. Imperviously sealing such an insulation batt prevents the incursion of moisture therein, thereby causing the batt to retain its originally designed insulation value.

The heat reflective coating material 28, known by the trade name Super Therm®, generally comprises a waterborne, acrylic urethane resin based, ceramic filled coating material. The ceramics comprise finely divided electromagnetically reflective particles which are specifically sized to reflect different wavelengths of the electromagnetic spectrum, i.e. primarily infrared and some visible light. The various ceramic particles tend to migrate upwardly or downwardly relative to the surface of the liquid coating after application, before the coating completely cures and bonds to the underlying substrate. A first, thermally non-conductive ceramic layer will form adjacent the underlying substrate. A second layer forms above the first, with the second layer primarily reflecting short wave energy. The outermost third and fourth layers of ceramic particles respectively tend to reflect long wave radiation in and near the visual spectrum, and infrared radiant energy. The result is a coating which provides essentially the same, or greater, thermally protective benefits than a much thicker blanket of conventional mineral fiber material, and which greatly increases the insulation efficiency of such material when applied thereto.

Figure 3:
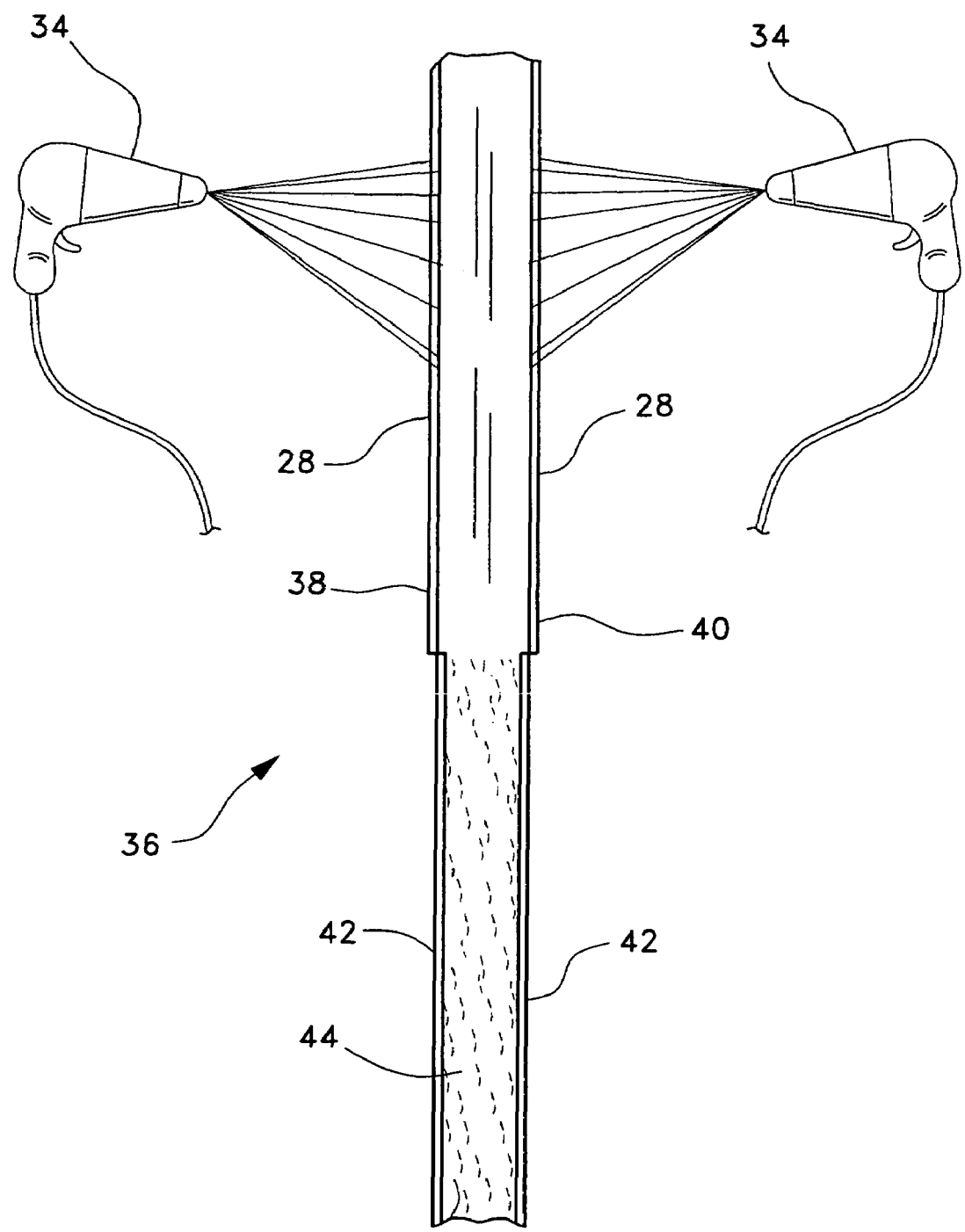
FIG. 3 is an edge elevation view similar to that of FIG. 2, but showing the encapsulation of a sheet of gypsum wallboard.

The present invention is not limited only to the application of Super Therm® thermally reflective coating material to mineral fiber insulation batts, as illustrated in FIGS. 1A through 2. The present method includes the application of Super Therm® to virtually any building construction panel, whether rigid or flexible and/or insulating or non-insulating. In FIG. 3, a portion of a sheet of gypsum wallboard 36 is illustrated, receiving coatings 28 of thermally reflective material on both sides 38 and 40 thereof. The lower portion remains uncoated, with the edges of the conventional paper covering sheets 42 visible over the gypsum core material 44. The coating of the upper portion has been completed, with the thickness of the coating material 28 being shown in FIG. 3. The heat reflective material 28 may be applied to innumerable other panel materials as well, e.g. plywood, chipboard, Masonite®, etc., and to various open or closed cell foam plastic insulation panels or boards as well, e.g. polystyrene foam plastics (Styrofoam®) and other materials formed in the configuration of rigid or flexible panels or boards and used in building construction.

FIG. 4 provides a flow chart describing the general steps in carrying out the method of the present invention. The first step 46 of FIG. 4 generally describes the coating of at least one side of sheet construction material, e.g. any of the panel types noted above, including insulation batts, etc., at the time of manufacture of the panel, using a heat reflective coating material, e.g. Super Therm®. Optionally, both sides, both edges, and both ends of the panel may be coated with the heat reflective material to completely seal and encapsulate the panel and any irritant substances therein, generally as indicated by the optional second step 48 of FIG. 4. Finally, the coated construction panels are shipped to the distributor or job site, as indicated by the third step 50 of FIG. 4. Optionally, uncoated panels could be shipped to a central or regional distributor or other handling point, and coated with the heat reflective material at that point. The critical point here is that the coating be accomplished at some point removed from the site of final use of the panels, in order to achieve the economies of scale and other benefits noted further above.

In conclusion, the present method of applying a heat resistant coating to a substrate comprising a building construction panel, provides panels having significant advantages over building panels not having such a coating. While the present method may be applied to any practicable building panel, it is particularly well suited for application to fibrous insulation batts, where the insulating properties of the batt in combination with the heat reflective properties of the coating material used in the present method, provide superior insulating efficiency in comparison to conventional insulation batts. The coating of such insulation batts on all sides, edges, and ends to completely seal the batt against moisture and against the escape of fibrous particles therefrom, provides further advantages in handling the batts and in maintaining the insulation efficiency of such a completely encapsulated batt. The present method is primarily directed to use at the site of manufacture of the panels, or at least at some central or regional distribution point for the panels, in order to achieve the economies of scale and encapsulation of the interior materials of the panels, and to avoid the problems associated with smaller scale coating operations in the field at the job site. The building panels coated in accordance with the present method, will thus be greatly appreciated by those in the building construction trades.

It is to be understood that the present invention is not limited to the embodiments described above, but encompasses any and all embodiments within the scope of the following claims.

I claim:

1. A method of improving the insulating efficiency, flame resistance, sound dampening, and mold and mildew resistance of building construction sheet materials, comprising the steps of:
   (a) providing at least one panel of building construction material at a manufacturing site therefor;
   (b) further providing a heat reflective, sound dampening, mold and mildew resistant coating material in a liquid state;
   (c) applying the heat reflective coating to the panel of building construction material at the manufacturing site of the panel of building construction material, to at least one side thereof;
   (d) air drying the heat reflective coating on the panel of building construction material;
   (e) providing at least one loose fiber insulation batt as the panel of building construction material;
   (f) bonding a backing sheet to one side of the loose fiber insulation batt;
   (g) coating the backing sheet with the heat reflective coating; and
   (h) coating the loose fiber insulation ban on both sides and all edges and ends thereof, completely encapsulating the insulation batt and imperviously sealing the insulation batt against moisture penetration.

2. The method of improving insulating efficiency according to claim 1, further comprising the steps of:
   (a) providing at least one foam plastic insulation board as the panel of building construction material; and
   (b) coating the foam plastic insulation board with the heat reflective coating on at least one side thereof.

3. A method of preventing emission of fibrous particles from fibrous insulation batts, comprising the steps of:
   (a) providing at least one loose fiber insulation batt of building construction material;
   (b) further providing a heat reflective coating material in a liquid state;
   (c) applying the heat reflective coating to the loose fiber insulation batt on both sides and all edges and ends thereof, completely encapsulating the insulation batt and precluding escape of fibrous particles therefrom; and
   (d) air drying the heat reflective coating on the insulation batt.

4. The method of improving the insulating efficiency of building construction sheet materials according to claim 3, further comprising the step of applying the heat reflective coating to the insulation batt at the manufacturing site thereof.

5. A method of forming a composite heat reflective sheet of building material including a panel of building construction material having mutually opposed first and second sides, mutually opposed first and second edges, and mutually opposed first and second ends, said method comprising the steps of:
   (a) applying a heat reflective coating to the panel of building construction material to at least one side thereof, at a manufacturing site for the panel of building construction material;
   (b) air drying the heat reflective coating on the panel of building construction material at the manufacturing site thereof;
   (c) providing at least one loose fiber insulation batt as the panel of building construction material;
   (d) bonding a backing sheet to one side of the loose fiber insulation batt;
   (e) coating the backing sheet with the heat reflective coating; and
   (f) coating the loose fiber insulation batt on both sides and all edges and ends thereof, completely encapsulating the insulation batt and imperviously sealing the insulation batt against moisture penetration.

6. The method of forming a composite heat reflective sheet of building material according to claim 5, further comprising the steps of:
   (a) providing at least one foam plastic insulation board as the panel of building construction material; and
   (b) coating the foam plastic insulation board with the heat reflective coating on at least one side thereof.

* * * * *